C. VAN NOORT & F. VISSER.
RESILIENT WHEEL.
APPLICATION FILED JULY 10, 1917.

1,299,876.

Patented Apr. 8, 1919.

WITNESSES

INVENTORS
Cornelius Van Noort &
Frank Visser
BY
ATTORNEY

UNITED STATES PATENT OFFICE.

CORNELIUS VAN NOORT AND FRANK VISSER, OF PATERSON, NEW JERSEY.

RESILIENT WHEEL.

1,299,876.  Specification of Letters Patent.  Patented Apr. 8, 1919.

Application filed July 10, 1917. Serial No. 179,754.

*To all whom it may concern:*

Be it known that we, CORNELIUS VAN NOORT and FRANK VISSER, citizens of the United States, residing at Paterson, in the county of Passaic and State of New Jersey, have invented certain new and useful Improvements in Resilient Wheels, of which the following is a specification.

This invention relates to resilient wheels and more particularly to an improved construction for vehicle wheels whereby the necessity for a pneumatic tire will be obviated.

The principal object of the invention is to provide a resilient wheel of this character so constructed as to possess all of the resiliency heretofore obtained only by the use of pneumatic tires and which will be less likely to be injured and made inoperative than are the pneumatic tires now generally used.

Another object of the invention is to provide novel cushioning means supporting segmental rim sections and so associated with the component parts of the wheel as to permit the same to be easily and quickly assembled during construction.

A further object of the invention is the provision of a resilient wheel which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of our invention, in which;

Figure 1 is a fragmentary elevation of a wheel constructed in accordance with our invention and showing portions thereof in section to fully disclose the construction.

Fig. 2 is a section on the line 2—2 of Fig. 1.

Fig. 3 is a section on the line 3—3 of Fig. 1.

Referring to the drawing, wherein is illustrated the preferred form of our invention, and in which like numerals of reference indicate corresponding parts throughout the several views, the hub 1 is constructed in any preferred manner and has a plurality of cylindrical casings 2 radiating therefrom. These cylindrical casings 2 are fastened to the hub in any preferred manner and each forms a part of each spoke of the wheel. The outer end of each cylindrical casing 2 is screw threaded to receive a coupling sleeve 3 which has one end slightly enlarged and provided with interior screw threads to engage the screw threads on the end of the casing 2. The opposite end of the coupling sleeve 3 is slightly reduced in diameter and is also provided with interior screw threads to receive the screw threads on the inner end of a tube 4 which also forms a part of the spoke. The outer end of the tube 4 is secured to a bushing 5 which is mounted in an opening in the felly 6 of the wheel. This felly, as shown to advantage in Fig. 3 of the drawing, is concaved and the openings are arranged at circumferentially spaced intervals to correspond with the end of each spoke. Each bushing 5 has an annular flange resting on the top of the felly and it will be observed that when the bushing is secured into position in the end of the tube 4, the latter will be fixed and held against displacement thus providing the necessary rigidity for the spoke.

Mounted within the tube and projecting into the casing 2 is a plunger rod 7 the inner end of which is provided with a head 8 engaging the end of a coiled compression spring 9 which has its opposite end bearing against the hub. The plunger rod 7 extends through the bushing 5 and considerably beyond the same as shown to advantage in Figs. 1 and 3. The outer rim of the wheel consists of a plurality of segmental sections one of which is attached to each plunger rod and for the present purposes a decription of one of these sections will suffice. A transversely arched plate 10 which is also curved circumferentially to conform to the curve of the periphery of the wheel is of a length equal to the length of one of the sections. The circumferential edges of each plate are bent inwardly beneath the plate as shown clearly in Figs. 2 and 3 of the drawing and the marginal edges of the plate are then turned radially to form the flanges 11. The inwardly turned portion at each side of the plate forms a spring 12 which adds to the resiliency of the wheel and assists in absorbing shocks while the wheel is in operation. The outer end of the plunger rod 7 is attached to the flanges 11 intermediate the ends of the latter by a fastening belt 13 which is extended through the flanges and through a suitable opening in the end of the plunger rod. Suitable washers are also interposed between the flanges and the plunger rod as shown in Fig. 3.

Surrounding the plunger rod 7, at the outer end thereof is a coiled compression spring 14 the same being incased in the resilient rubber bumper 15. This rubber bumper is of substantially conical formation and is interposed between the felly 6 and the edges of the flanges and completely embraces this end of the plunger rod 7. The spring 14 is preferably cast in the rubber bumper.

It will be observed that the proximate ends of the rim sections are slightly spaced apart thus permitting relative radial movement of the sections and, since the connection of each section to each plunger rod is through the medium of a single bolt it will be observed that the sections will have a tendency to rock or tilt on the fastening bolt 13 unless means is provided to prevent this movement and hold the ends of the sections in proper position. Therefore, we have provided the arcuate flat springs 16 the ends of which are fixed to the felly and to the ends of the flanges 11. These springs are sufficient to hold the ends of the sections in proper relation.

Mounted upon the outside face of each plate 10 is a tread or shoe 17 held in position by the clamp sections 18 fixed to the plate 10.

The yieldable connection of the sections with the tubular spokes is such as to maintain a required rigidity and stability while at the same time producing sufficient spring action and resiliency to cause the wheel to act in substantially the same manner as in the case of a wheel having a pneumatic tire.

From the foregoing it will be observed that a very simple and durable resilient wheel has been provided, the details of which embody the preferred form. We desire it to be understood, however, that slight changes in the minor details of construction may be made without departing from the spirit of the invention or the scope of the claim hereunto appended:

A resilient wheel comprising a felly having circumferentially spaced openings and equipped with cylindrical spokes, plunger rods extended through the openings in the felly and having their inner ends resiliently supported in the said cylindrical spokes, a rim section attached to the outer end of each plunger rod, each rim section having flanges fixed to opposite sides of the plunger rod, a tapered resilient element embracing each plunger rod at the extended end thereof between the felly and the said flanges, the terminals of the said rim sections being slightly spaced apart, and curved spring elements connecting the ends of the rim sections together and fixed to the said felly to prevent excessive tilting movement of the said rim sections on the ends of the said plunger rods.

In testimony whereof we affix our signatures in presence of two witnesses.

CORNELIUS VAN NOORT.
FRANK VISSER.

Witnesses:
 JOHN F. EVANS,
 ADRIANUS VAN DEN WALL.